J. N. BASHAW.
AUTOMOBILE SHAFT COUPLING.
APPLICATION FILED FEB. 18, 1911.
1,022,999.
Patented Apr. 9, 1912.
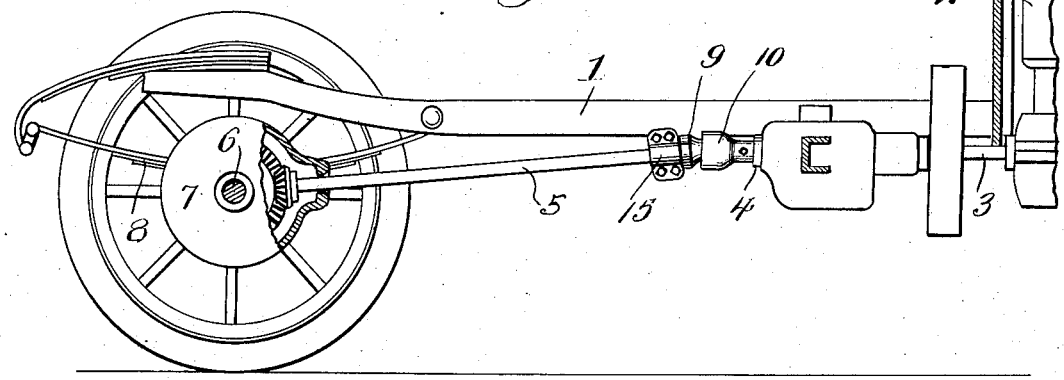
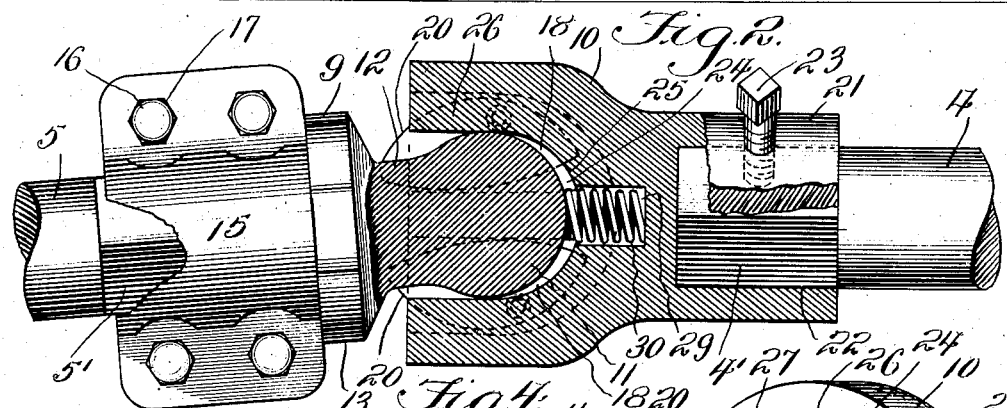
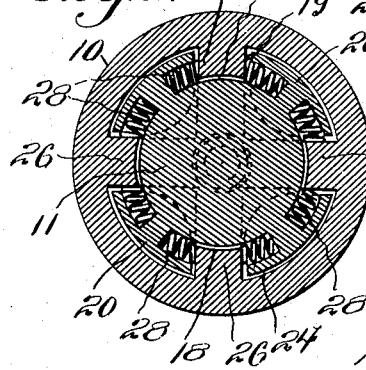
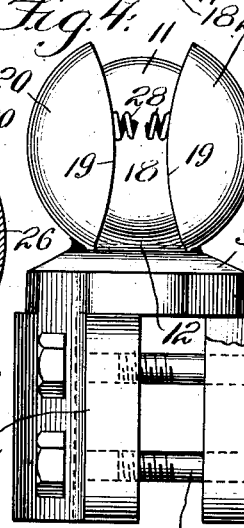
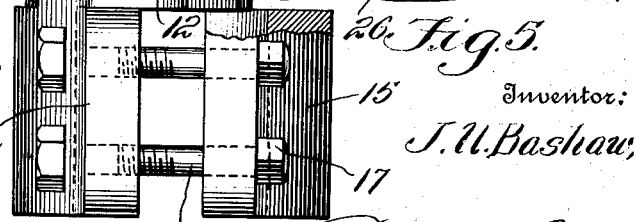
Witnesses:
J. T. L. Wright
R. N. Jones
Inventor:
J. N. Bashaw,
By
Attorney.

UNITED STATES PATENT OFFICE.

JOHN N. BASHAW, OF LAKE GENEVA, WISCONSIN.

AUTOMOBILE SHAFT-COUPLING.

1,022,999.  Specification of Letters Patent.  Patented Apr. 9, 1912.

Application filed February 18, 1911. Serial No. 609,492.

*To all whom it may concern:*

Be it known that I, JOHN N. BASHAW, a citizen of the United States, residing at Lake Geneva, in the county of Walworth and State of Wisconsin, have invented certain new and useful Improvements in Automobile Shaft-Couplings, of which the following is a specification.

This invention relates to a universal coupling or ball-chuck joint for connecting the transmission shaft of an automobile drive gearing with the driven shaft of the gearing, whereby driving motion is imparted from the motor to the rear axle.

As is well known, the transmission shaft of an automobile drive gearing is mounted to turn in fixed bearings, and in a substantially horizontal position, upon the frame or chassis of the vehicle, while the driven shaft runs at an angle to the transmission shaft, is coupled at its forward end thereto, and at its rear end is in gear with the rear axle and journaled in a gear casing carried by the axle and flexibly connected therewith to the frame by suspension springs. As the driven shaft in service frequently runs at a very high speed and at the same time rises and falls with the rear axle and is further subjected to both longitudinal and lateral deflections from the vibrations of the vehicle, it is evident that the coupling joint is subjected to considerable strain from the relative motions of the parts, as well as wear and tear from friction.

So far as I am aware, no joint for the purpose has heretofore been devised which will permit the driven shaft to have the necessary freedom of universal motion without cramping or binding, and which will at the same time take up all slack or lost motion between the parts, due to wear or other causes.

It is the object of my invention to provide a coupling which will effectually perform all these functions and overcome the objections to prior devices of its kind.

In the accompanying drawings,—Figure 1 is a vertical longitudinal section through a portion of an automobile chassis, showing the application of the invention. Fig. 2 is a view partly in longitudinal section and partly in side elevation of the assembled members of the joint, with portions broken away. Fig. 3 is a vertical transverse section through the assembled members of the joint. Fig. 4 is a plan view of the ball member of the joint. Fig. 5 is a perspective view of the socket member of the joint.

Referring to the drawings, 1 designates the chassis or frame of an automobile; 2, the motor; 3, the driving shaft; 4, the transmission shaft; 5, the inclined driven shaft; 6, the rear axle in gear with and driven from said driven shaft; 7, the gear casing mounted on said axle and in which the rear end of the driven shaft is journaled; and 8, one of the suspension springs flexibly connecting the chassis with the rear axle and driven shaft for relative cushioning movements in a vertical plane.

The coupling comprises a ball member 9 and a socket member 10. The ball member consists of a head composed in part of a body 11 of generally spherical form and provided at its outer or rear side with a neck 12, integrally connecting the head with a flange or collar 13. Extending from one side of the center of the rear face of this flange is a fixed clamping plate 14, which is adapted for coöperation with a removable and adjustable clamping plate 15, said plates having their inner faces recessed to provide an angular socket for the reception of the angular end 5' of the shaft 5. Bolts 16 pass through the ends of these clamping plates and are provided with nuts 17, whereby the ball member may be firmly clamped to the shaft. This construction allows the shaft 5 to be easily coupled and uncoupled in assembling the parts or disassembling them for repairs or other purposes, and also permits of a degree of longitudinal adjustment of the ball member on the angular end of the shaft to compensate for any slight variation from the normal which may exist in the length of the shaft.

The body or head 11 is formed at equidistant points with grooves 18 extending in the direction of length of the socket member, four of such grooves being preferably employed arranged at intervals of ninety degrees about the head. These grooves intersect one another at the outer end of the head, and extend to the base of the neck. Each groove flares from its center toward its ends and is provided with slightly beveled or undercut side walls 19. As a result of this construction, the body 11 is given a generally spherical form as before described, while formed thereon are lugs 20 equal in number to and arranged between the grooves, the walls 19 being common to said lugs and grooves. It will be observed that these lugs, while oval in plan, have their outer faces curved on arcs or segments of a circle of greater diameter than the body 11 and set eccentric to the axis of the body, for reasons hereinafter described.

The socket member 10 consists of a shell having at its outer or forward side a neck 21 formed with an angular socket 22 to receive the angular end 4' of the transmission shaft 4, said neck being provided with one or more set screws 23 to clamp it to said shaft. In the shell is formed a socket 24 to receive the head of the ball member, said socket being cup-shaped, that is to say, having its outer portion cylindrical or substantially so from its transverse center to its open end and its inner portion terminating in a rounded or hemispherical wall 25 concentric with the axis of the socket and the center of rotation of the shaft 4. On the interior of the socket is arranged a series of ribs 26 equal in number to the grooves 18 and arranged to fit therein, which ribs extend the full length of the socket and are straight along the outer half of the socket and curved at the inner end of the socket to conform to the curvature of the wall 25, at the center of which they intersect one another, as shown. Between, and by the formation of, these ribs pockets or cavities 27 are provided in which fit the lugs 20. The side walls of these ribs are straight and parallel and spaced a distance somewhat less than the contracted portions of the walls of the grooves 18, whereby through the flaring formation of said grooves, the head is permitted to swing laterally in the socket on the contracted portions of the walls as an axis, insuring ease of motion without either undue looseness or binding of the parts. It will be observed that the neck or contracted portion of the head extends beyond the socket and that the curved portions of the ribs extend across the intersecting portions of the grooves, whereby free vertical pivotal motion of the head is also secured while a maximum degree of engagement between the head and socket is maintained.

It will be observed that the axis of the body 11 of the head is set slightly eccentric to the center line of the shaft 5 and coincident with the center line of the shaft 4, while the axis of the lugs 20, or center of the incomplete circle formed thereby, is set slightly eccentric to the axis of the body 11 and center line of the shaft 4; but coincident with the center line of the shaft 5. Hence when the vehicle is running easily along a level road or street or is lightly loaded, and there is comparatively little relative vertical play of and between the shafts 4 and 5, or depression of the springs 8, and the shaft 5 extends at its greatest angle to the shaft 4, a minimum degree of contact of the surfaces of the lugs between the ribs to lock the coupling members for rotation in unison will be presented for the reduction of friction. As, however, the lugs interlock with both the straight and curved portions of the ribs, a sufficient area of interengaging surfaces is provided to obviate liability of any of the parts breaking under strain. When, on the other hand, the vehicle is heavily loaded and the springs 8 depressed to a greater degree, or the shaft 5 vibrates vertically to some considerable extent in the travel of the vehicle over rough surfaces, any relative movement of the said shafts 4 and 5 tending to bring said shafts into longitudinal alinement will cause the axis of the lugs to be brought to a corresponding degree closer to the axis of the socket, whereby the engaging area of their interlocking surfaces will be increased to adapt them to withstand the additional imposed strains.

I have found in practice that by slightly beveling or undercutting the side walls of the grooves 18 a reduction of friction between said walls and the ribs 26 is secured, particularly when the parts of the coupling are subjected to lateral jolts and jars. In order further to reduce this friction, reduce and take up wear, absorb such shocks or jars and prevent rattling, I provide the walls 19 of the grooves 18 at their contracted points with compressed cushioning springs 28 seated in sockets in said walls 19 and bearing against the sides of the ribs 26, which always maintain a perfect contact between the engaging surfaces. These springs also take up the lateral thrusts of the shaft from the endwise shifting of the axle 6. I also provide at the center of the curved wall of the socket 22 a recess 29 in which is seated a compressed coiled cushioning spring 30 which bears against the rounded outer end of the body 11 and absorbs the relative endwise motions of the shafts, reducing the friction and liability of damage to the coupling which would otherwise ensue.

From the foregoing description, it will be apparent that my invention provides a coupling for the purpose outlined which is not only simple, durable and inexpensive, but also adapted to work easily and smoothly and adjust itself instantaneously to the various motions of the driven shaft, whereby excess friction and strains are avoided; also that a constant engagement between the locking elements of the coupling is maintained in all the movements of the driven shaft, all wear between the working surfaces taken up, and rattling prevented.

Having thus fully described my invention, what I claim and desire to secure by Letters Patent is:—

1. In a coupling for connecting a transmission shaft with a flexibly mounted driven shaft running at an angle thereto, the combination of a socket member having a cup-shaped socket cylindrical at its open end and hemispherical at its closed end and provided with a plurality of radial ribs extending along the cylindrical portion of the socket to the center of the hemispherical portion of the socket, and serving to present between them a plurality of pockets extending to the point of intersection of the ribs, and a ball member including a head having a substantially spherical body provided in its outer surface with a plurality of lugs of oval shape in plan and set eccentric to the axis of the body and forming segments of a circle of a larger diameter than the body and adapted to fit within said pockets of the socket member, and grooves between said lugs to receive said radial ribs, said grooves intersecting one another at the outer portion of the head and being contracted at the center and thence gradually widened toward their ends.

2. In a coupling for connecting a transmission shaft with a flexibly mounted driven shaft running at an angle thereto, a member having a cup-shaped socket cylindrical at its open end and hemispherical at its closed end, said socket being provided at the center of its hemispherical end with an axial recess and being provided with longitudinal radial ribs curved at their inner ends to correspond to the curvature of said hemispherical end and intersecting each other at said recess, said ribs forming tapering pockets between them, a ball member including a substantially spherical head inclosed in said sockets and provided with lugs and intervening grooves respectively engaging said pockets and receiving said ribs, said lugs being elliptical in plan set eccentric to the axis of the head, and forming segments of a circle of greater diameter than the head, and said grooves being contracted midway of their length and widened toward their opposite ends and having their side walls formed with sockets, springs seated in the sockets in the side walls of the grooves and bearing against the sides of the ribs, and a spring seated in the axial recess in the socket member and bearing upon the head at the point of intersection of said grooves.

In testimony whereof I affix my signature in presence of two witnesses.

JOHN N. BASHAW.

Witnesses:
F. J. TYRRELL,
ALICE E. MARSHALL.